United States Patent [19]

Townsend

[11] Patent Number: 5,073,335
[45] Date of Patent: Dec. 17, 1991

[54] BWR TURBOPUMP RECIRCULATION SYSTEM

[75] Inventor: Harold E. Townsend, Campbell, Calif.

[73] Assignee: General Electric Company, San Jose, Calif.

[21] Appl. No.: 660,306

[22] Filed: Feb. 25, 1991

Related U.S. Application Data

[63] Continuation-in-part of Ser. No. 553,073, Jul. 10, 1990.

[51] Int. Cl.[5] .............................................. G21C 15/24
[52] U.S. Cl. .................................... 376/373; 376/404; 376/406
[58] Field of Search ............... 376/372, 373, 377, 404, 376/406, 407, 352

[56] References Cited

U.S. PATENT DOCUMENTS 4,879,087 11/1989 Akiyama et al. ...................... 376/216
5,009,838 4/1991 Shioyama et al. .................... 376/310

OTHER PUBLICATIONS

Wilkins et al., *Advanced BWR: Design Improvements Build on Proven Technology*, Nuclear Engineering International, reprint Jun. 1986, pp. 1–7 and drawing entitled "The World's Reactors No 89".

*Primary Examiner*—Brooks H. Hunt
*Assistant Examiner*—Frederick H. Voss
*Attorney, Agent, or Firm*—Robert R. Schroeder

[57] ABSTRACT

A recirculation system is disclosed for driving reactor coolant water in an annular downcomer defined between a reactor vessel and a core shroud spaced radially inwardly therefrom. The system supplies feedwater to the vessel and to a turbopump disposed inside the downcomer. The turbopump in accordance with one embodiment of the present invention includes a stationary axle and a pump impeller rotatably joined thereto and having an inlet end for receiving the coolant water from the downcomer. An annular plenum surrounds the impeller for channeling feedwater to a plurality of turbine blades joined to the impeller for rotating the impeller for driving the coolant water. The impeller is lubricated solely by the feedwater upon rotation of the impeller about the axle.

11 Claims, 4 Drawing Sheets

BWR TURBOPUMP RECIRCULATION SYSTEM

CROSS REFERENCE TO RELATED APPLICATION

This is a continuation-in-part of application Ser. No. 07/553,073, filed 10 July 1990.

TECHNICAL FIELD

The present invention relates generally to a boiling water reactor (BWR), and, more specifically, to a reactor coolant water recirculation system therefor.

BACKGROUND ART

A conventional boiling water reactor includes a reactor pressure vessel within which is disposed a nuclear reactor core surrounded by an annular core shroud. The core shroud is spaced radially inwardly from the reactor vessel to define an annular flow channel, or downcomer, in which is recirculated reactor coolant water. The coolant water typically flows downwardly from near the top of the reactor vessel, through the downcomer, around the bottom of the core shroud and then upwardly through the reactor core wherein it is heated for generating steam which is then suitably channeled to a conventional steam turbine which powers an electrical generator for generating power for a utility grid.

The steam turbine extracts energy from the steam and causes the steam to condense into its liquid phase for forming feedwater. The feedwater is then returned to the reactor vessel under pressure from a conventional feedwater pump in a basically closed cycle. The feedwater returned to the reactor vessel is discharged from a conventional feedwater sparger from which it mixes with the reactor coolant water therein for repeating the cycle.

In order to increase the recirculation of the coolant water in the reactor vessel, conventional coolant pumps are provided, in one example, external of the reactor vessel and are suitably connected thereto by external piping. This is conventionally done to increase the reliability of the reactor for preventing damage to internal reactor components due to any failure of the coolant pumps. The external piping loop system associated with the use of external coolant pumps has increased maintenance requirements in view of the relative complexity thereof and may lead to substantial radiation exposure to maintenance personnel working adjacent thereto due to radioactive corrosion deposition within the pipes.

In one advanced boiling water reactor design, a coolant pump is located inside the reactor vessel and is powered by a motor located outside the reactor vessel. Accordingly, a rotating shaft must extend through the reactor vessel and must include suitable seals for preventing leakage of the high pressure coolant water which flows within the reactor vessel. Such pump and motor arrangement is relatively complex and requires a relatively complex shaft seal for preventing leakage. Furthermore, a typical boiling water reactor allows placement of the pump and motor arrangement in a limited area typically at the bottom of the reactor vessel adjacent to conventional control rod drives thus increasing congestion of these components and increasing the complexity o maintenance thereof.

Conventional motors for powering the coolant water pumps are typically limited in their ability to withstand elevated temperature and elevated pressures associated with a conventional boiling water reactor. For example, the coolant water channeled within an exemplary reactor vessel has a temperature of about 520° F. (271° C.) for an exemplary embodiment, and has a pressure of about 1,000 psi (6.89 MPa). Such a high temperature would severely shorten the service life of conventional motors since the materials thereof will rapidly degrade at such elevated temperatures. Furthermore, the high pressure of the coolant water would have to be accommodated in suitable seals associated with the motor. Furthermore, the environment inside the reactor vessel includes radiation which is known to degrade conventional electrical insulation used in electric motors as well as degrade conventional hydrocarbon-type lubricants also used therein. Such lubricants also present the additional problem of contamination of the reactor coolant water if they should leak from the motor or pump.

Accordingly, electrical motors typically used for driving pumps are located external of the pressure vessel to avoid degradation due to radiation or high temperature and to eliminate the possibility of contamination of the coolant water. However, where the motor is located external to the reactor vessel and the pump is located internal to the reactor vessel, suitable high pressure seals must still necessarily be provided for containing the high pressure coolant water within the reactor vessel without leakage.

OBJECTS OF THE INVENTION

Accordingly, one object of the present invention is to provide a new and improved boiling water reactor recirculation system.

Another object of the present invention is to provide a recirculation system having a powered pump disposed wholly within the reactor vessel.

Another object of the present invention is to provide a recirculation system having a powered pump capable of operation in the high temperature, high pressure, radiation environment within a reactor vessel, and without the possibility of contamination of the coolant water.

DISCLOSURE OF INVENTION

A recirculation system is disclosed for driving reactor coolant water in an annular downcomer defined between a reactor vessel and a core shroud spaced radially inwardly therefrom. The system includes means for supplying feedwater to the vessel and to a turbopump disposed inside the downcomer. The turbopump in accordance with one embodiment of the present invention includes a stationary axle and a pump impeller rotatably joined thereto and having an inlet end for receiving the coolant water from the downcomer. An annular plenum surrounds the impeller for channeling feedwater to a plurality of turbine blades joined to the impeller for rotating the impeller for driving the coolant water. Means are provided for lubricating the impeller solely by the feedwater upon rotation of the impeller about the axle.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawing in which:

MODES(S) FOR CARRYING OUT THE INVENTION

Figure 1:
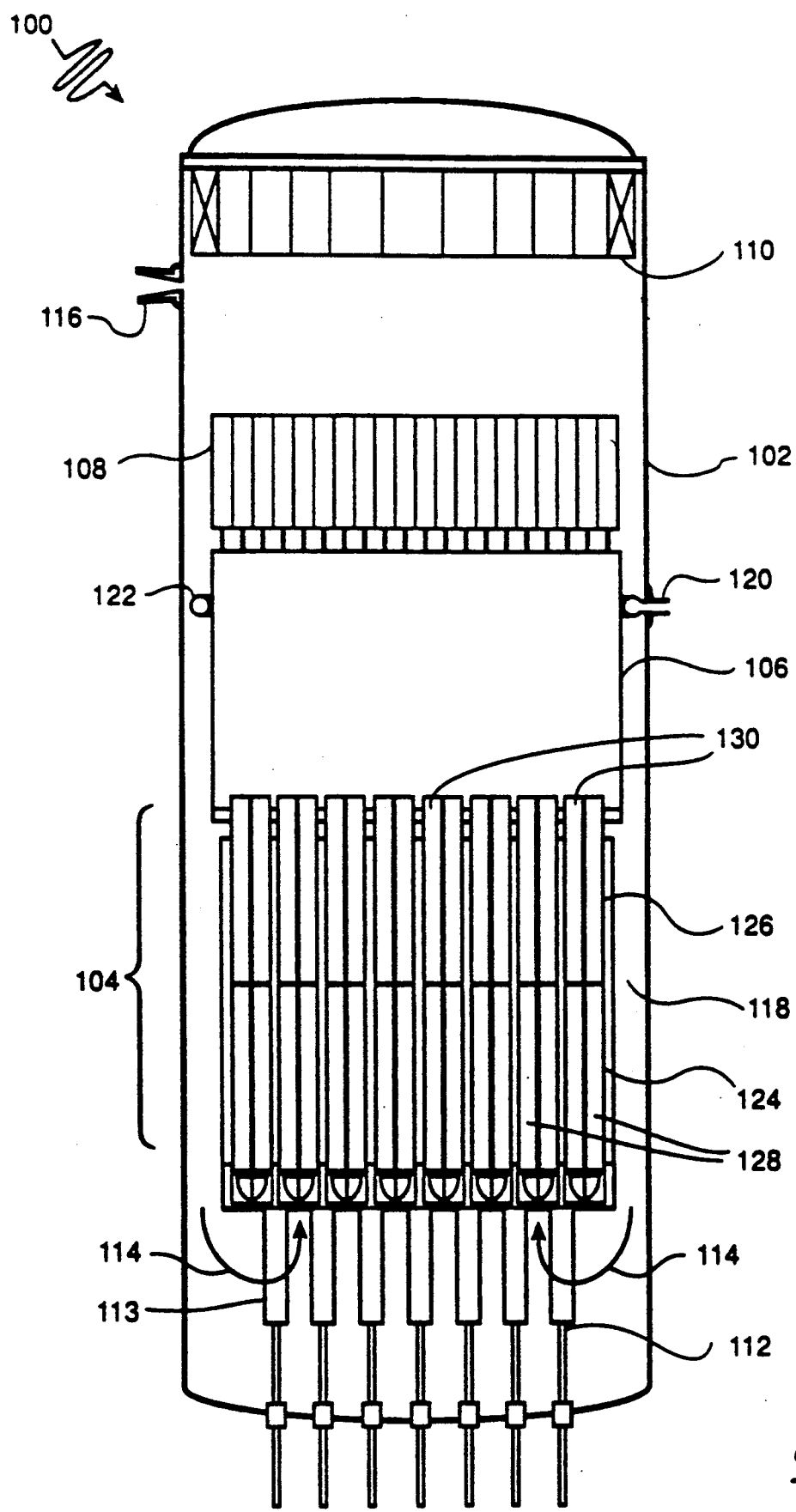
FIG. 1 is a schematic elevation sectional view of a reactor having a recirculation system in accordance with one embodiment of the present invention.

Illustrated in FIG. 1 is an exemplary natural circulation boiling water reactor 100 comprising a pressure vessel 102, a core 104, a chimney 106, a steam separator 108, and a steam dryer 110. Control rod drive housings 112 extend through the bottom of the vessel 102 and support control rod guide tubes 113. The control rod guide tubes 113 extend to the bottom of the core 104 so that conventional control blades therein can be inserted into and retracted from the core 104 to control its power output.

Water flows, as indicated by arrows 114, into the core 104 from below. This subcooled water is boiled within the core 104 to yield a water/steam mixture which rises through the chimney 106. The steam separator 108 helps separate steam from water, and the released steam exits through a steam exit 116 near the top of the vessel 102. Before exiting, any remaining water entrained in the steam is removed by the dryer 110. The separated water is returned down a peripheral downcomer 118 by the gravity forces due to the difference in water density between the downcomer 118 and the chimney 106. The feedwater enters vessel 102 through a feedwater inlet nozzle 120 and feedwater sparger 122 to replenish and help cool the recirculating water in the downcomer 118.

The core 104 comprises a lower fuel matrix 124 and an upper fuel matrix 126. The upper fuel matrix 126 is filled with upwardly oriented fuel bundles 130, and the lower fuel matrix 124 is filled with downwardly oriented fuel bundles 128.

The water 114 may be additionally recirculated through the downcomer 118 by conventional pumps as described above. For example, conventional axial or centrifugal motor-driven pumps could be used, or, alternatively, a steam-driven jet pump could be used, requiring an auxiliary steam source but having no moving parts. However, such pumps have one or more of the disadvantages described above.

Another embodiment, in accordance with the present invention as described below, uses a turbine-driven internal pump. A water-driven turbine is coupled to a centrifugal pump and provides the recirculation flow. The motive fluid for the turbine would be the feedwater. This device is more efficient than the steam-driven jet pump, and eliminates the above mentioned disadvantages.

Figure 2:
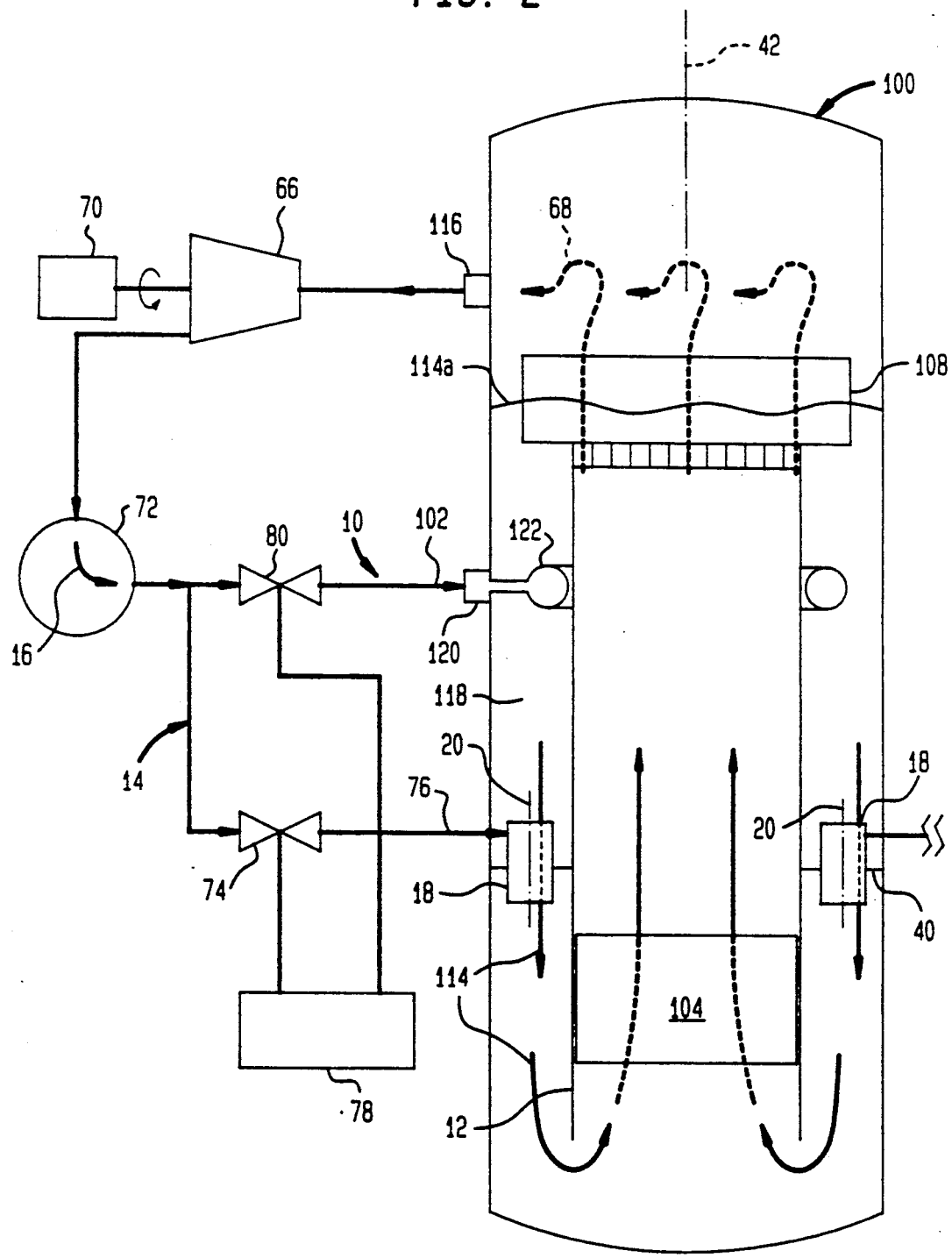
FIG. 2 is a schematic representation of the reactor illustrated in FIG. 1 including further components of the recirculation system.

More specifically, illustrated schematically in FIG. 2 is a recirculation system 10 in accordance with one embodiment of the present invention for driving the reactor coolant water 114 in the downcomer 118 inside the pressure vessel 102. The downcomer 118 is an annular flow channel defined between the nuclear reactor vessel 102 and a conventional annular core shroud 12 spaced radially inwardly therefrom, which surrounds the core 104. Means 14 for supplying feedwater 16 to the vessel 102 are shown schematically. A plurality of turbopumps 18 in accordance with one embodiment of the present invention are disposed inside the downcomer 118 and below the top or level 114a of the coolant water 114 for driving the coolant water 114 downwardly through the downcomer 118 for increasing the recirculation thereof.

Figure 3:
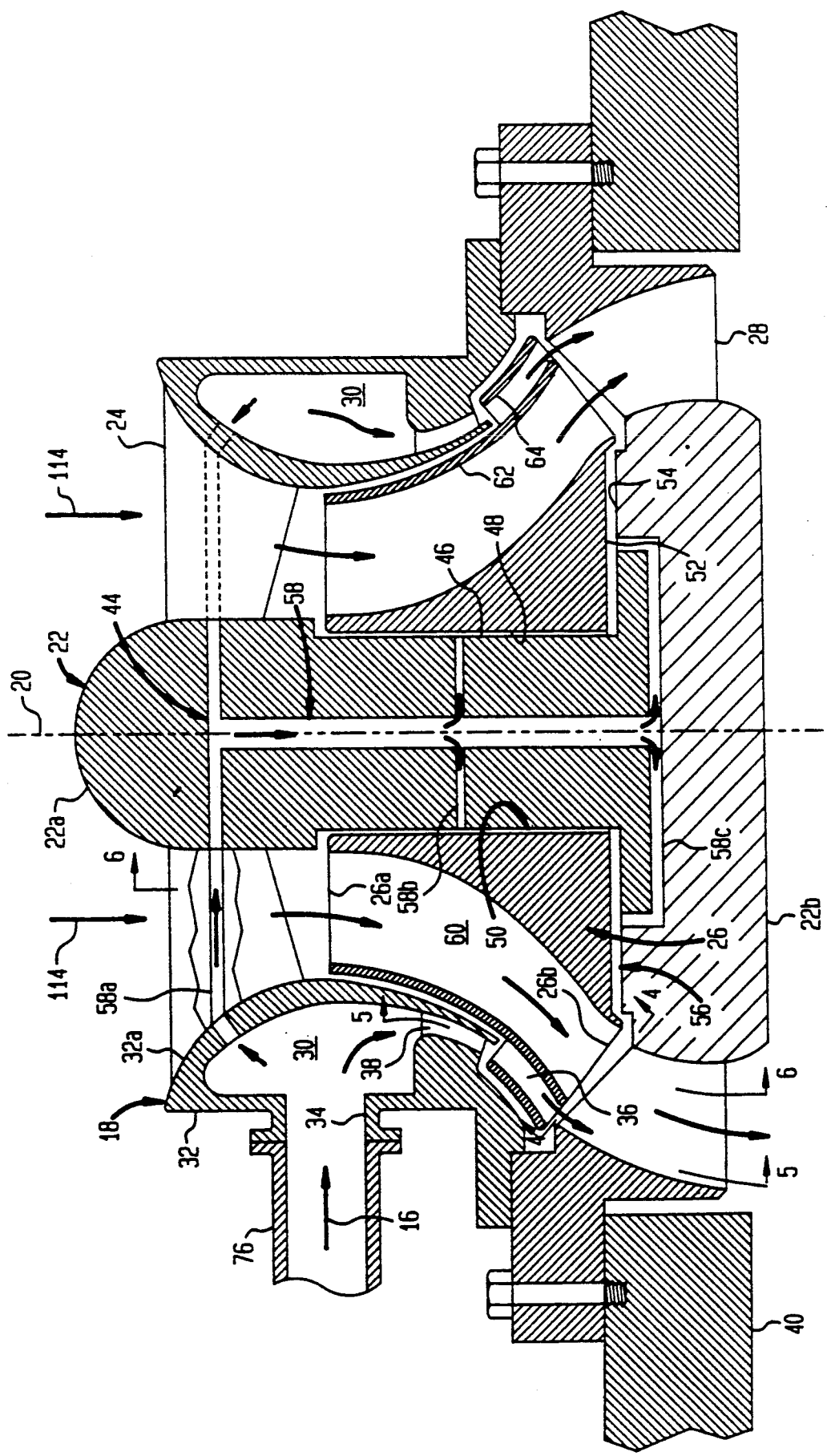
FIG. 3 is a schematic longitudinal sectional view of an exemplary turbopump used in the recirculation system illustrated in FIG. 2.

As illustrated in FIG. 3, each of the turbopumps 18 is axisymmetrical about a longitudinal centerline 20, and includes a stationary elongate axle 22 disposed coaxially with the centerline 20. A plurality of circumferentially spaced inlet guide vanes (IGV's) or struts 24 are fixedly joined to an upstream end 22a of the axle 22 for receiving therebetween the coolant water 114 from the downcomer 118.

A centrifugal pump impeller 26 is rotatably joined to the axle 22 and has an inlet end 26a for receiving the coolant 114 from the IGV's 24. The impeller 26 also includes an outlet end 26a or charging the coolant 114 at an increased pressure.

A plurality of circumferentially spaced outlet guide vanes (OGV's) or struts 28 are fixedly joined to a downstream end 22b of the axle 22 for channeling the discharged coolant 114 back into the downcomer 118 for continuing its passage through the downcomer 118 to the bottom of the vessel 102 wherein it turns radially upwardly around the downstream end of the core shroud 12 to flow into the core 104.

The turbopump 18 also includes an annular plenum 30 surrounding the impeller 26 and joined to the feedwater supplying means 14 for receiving the feedwater 16. More specifically, the turbopump 18 includes an annular casing 32 which surrounds the impeller 26, and which has an upstream end 32a to which the IGV's 24 are fixedly connected and a downstream end 32b to which the OGV's 28 are fixedly connected for supporting the upstream end 22a and the downstream end 22b of the axle 22, respectively. The casing 32 is generally toroidal-shaped to define the annular plenum 30 therein and includes an annular feedwater inlet 34 disposed in flow communication with the feedwater supplying means 14.

The turbopump 18 also includes a plurality of circumferentially spaced conventional water, or hydraulic, turbine blades 36 fixedly joined to the outlet end 26b of the impeller 26 at radially outer ends thereof, and disposed in flow communication with the plenum 30 for receiving the feedwater 16 for rotating the impeller 26 for driving the coolant 114 through the turbopump 18. A plurality of conventional circumferentially spaced, stationary nozzle vanes 38 are fixedly joined to the casing 32 in flow communication between the plenum 30 and the blades 36 for channeling the feedwater 16 to the blades 36 for rotating the impeller 26. In this exemplary embodiment of the present invention, the blades 36 are also disposed in flow communication with the OGV's 28 for discharging the feedwater 16 from the blades 36 to mix with the discharged coolant 114 from the outlet end 26b of the impeller 26.

The turbopumps 18 are disposed entirely inside the pressure vessel 102 and are, therefore, subject to the harsh reactor environment therein. More specifically, the turbopumps 18 are preferably conventionally supported by and bolted to an annular pump deck 40 which extends radially outwardly from a longitudinal centerline axis 42 of the vessel 102, as shown in FIG. 2, and between the reactor vessel 102 and the core shroud 12 for fixedly supporting the turbopumps 18 within the downcomer 118. The deck 40 and the turbopumps 18 are preferably disposed axially above the reactor core 104 for reducing radiation received thereby. The turbopumps 18 are also preferably disposed longitudinally in line with the downcomer 118 for assisting in driving the coolant 114 in the downward direction parallel with the natural gravity flow of the coolant 114. Preferably, the turbopump longitudinal axis 20 is disposed parallel to the vessel longitudinal axis 42, and the IGV's 24 and the OGV's 28 are longitudinally, or axially, spaced from each other for driving the coolant 114 by the impeller 26 generally parallel to the vessel centerline axis 42 within the downcomer 118.

Referring again to FIG. 2, since the turbopumps 18 are disposed in the downcomer 118, they are exposed to the relatively high temperature and high pressure of the coolant 114, which in an exemplary embodiment of the reactor 100 is about 520° F. (271° C.) and about 1,000 psi (6.89 MPa). Also in the preferred embodiment of the present invention, the feedwater 16 is provided to the plenum 30 by the supplying means 14 at a pressure of about 1,200 psi (8.27 MPa). The differential pressure between the feedwater 16 in the plenum 30 and the coolant 114 at the IGV's 24 and the impeller end 26a is used effectively in accordance with the present invention for rotating the turbine blades 36 and in turn the impeller 26 connected thereto for driving the coolant 114 through the turbopump 18. The feedwater 16 from the blades 36 and the coolant 114 from the impeller 26 are discharged to the common OGV's 28 at about the same pressure.

In view of the high temperature, high pressure, and radiation environment inside the vessel 102, conventional lubrication of the turbopumps 18 using, for example, hydrocarbon lubricants such as oil cannot be used. The coolant 114 cannot be contaminated from oil which might leak from a conventional pump. And, conventional pump and electrical motors which might alternatively be used would not be suitable for this environment since radiation is known to degrade hydrocarbon lubricants such as oil, and electrical insulation used around motor windings. The high temperature environment also is known to shorten service life and degrade conventional pumps and electrical motors. Furthermore, the high pressure environment within the vessel 102 would also require suitable high pressure seals for the conventional pumps and electrical motors.

The turbopump 18 disclosed above in accordance with the present invention is effective for eliminating all of these problems associated with conventional pumps and electrical motors driving such pumps. More specifically, since the turbopump 18 is hydraulically or water-driven by the feedwater 16 within the high pressure coolant 114 in the downcomer 118, only the differential pressure therebetween must be accommodated. And, this differential pressure is effectively used for driving the turbine blades 36, with the feedwater 16 being discharged between the OGV's 28 at a common outlet pressure with the coolant 114 discharged from the impeller 26.

Furthermore, the impeller 26 may be suitably rotatably supported and lubricated by the high pressure feedwater 16 channeled to the plenum 30. More specifically, means 44, as shown in FIG. 3, for lubricating the impeller 26 solely by the feedwater 16, and not by conventional lubricants such as oil, are provided which both lubricates the rotating impeller 26 and provides a water bearing interface between the impeller 26 and the axle 20 upon rotation of the impeller 26 about the axle 22.

Referring again to FIG. 3, the impeller 26 further includes a radially inner, axially extending, cylindrical surface 46 defining with a complementary radially outer, cylindrical surface 48 of the axle 28 a hydrodynamic radial bearing 50. The impeller 26 also includes a radially extending aft surface 52 which defines with a radially extending flange 54 of the axle 22 a hydrodynamic axial thrust bearing 56.

The lubricating means 44 preferably include a conduit 58 having a first portion 58a which extends through at least one of the IGV's 24 in flow communication with the plenum 30 for receiving a portion of the high pressure feedwater 16 therefrom and channeling the feedwater 16 through the conduit 58 to a second portion 58b which is disposed in flow communication between the inner surface 46 and the outer surface 48 of the radial bearing 50 for providing the feedwater 16 thereto for both hydrodynamically supporting the impeller 26 and providing lubrication between the impeller 26 and the axle 22. The conduit 58 also includes a third portion 58c which channels a portion of the feedwater 16 from the conduit 58 between the aft surface 52 and the radial flange 54 of the thrust bearing 56 for hydrodynamically axially supporting the impeller 26 and providing lubrication therebetween.

The feedwater 16 is suitably discharged from the radial bearing 50 and the thrust bearing 56 through gaps between the impeller 26 and the axle 22 to join with the coolant 114 being channeled through the turbopump 18. In this way, the differential pressure between the feedwater 16 in the plenum 30 and the coolant 114 channeled into the turbopump 18 is effectively used for not only driving the impeller 26 but for hydrodynamically supporting the rotating impeller 26 on the stationary axle 22 and providing lubrication therebetween utilizing solely the feedwater 16 without any conventional hydrocarbon-type lubricants.

In one exemplary embodiment of the turbopump 18 for the boiling water reactor 100 and for the exemplary pressures of the feedwater 16 in the plenum 30 and of the coolant 114 channeled to the turbopump 18, the impeller 26 preferably includes a plurality of circumferentially spaced conventional mixed flow impeller blades 60. Mixed flow for a hydraulic turbine is a conventional term meaning that the blades 60 are sized and configured for channeling the coolant 114 both axially and radially as it passes through the impeller 26. For the exemplary embodiment illustrated, the impeller 26 has a specific speed of about 5,000 in english units, and 197 in metric units.

As illustrated in FIG. 3, the turbine blades 36 are preferably fixedly joined to the impeller blades 60 at the impeller outlet end 26b. In this way, the turbine blades 36 are disposed radially outwardly from the centerline axis 20 at the largest outer diameter of the impeller 26 for providing more effective rotation of the impeller 26.

Figure 4:
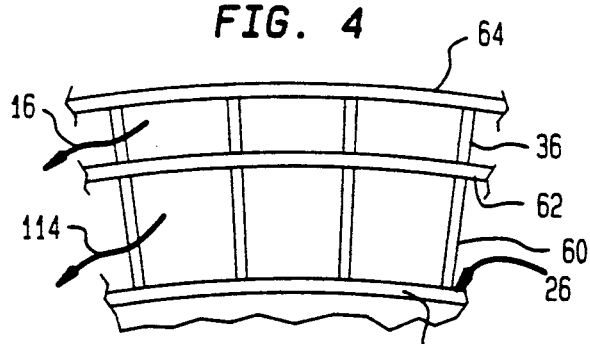
FIG. 4 is a transverse sectional view of a portion of the impeller and turbine blades illustrated in FIG. 3 taken along line 4—4.

In the exemplary embodiment of the turbopump 18, as illustrated in FIG. 4, an annular impeller shroud 62 is fixedly joined to the tips of the impeller blades 60 for providing an outer flow boundary for the coolant 114 being channeled through the impeller 26. The turbine blades 36 are conventionally fixedly joined to the impeller blades 60 at the impeller shroud 62, and may also include an annular turbine shroud 64 surrounding the tips of the turbine blades 36 for providing an outer flow boundary for the feedwater 16 channeled through the turbine blades 36.

Figure 5:
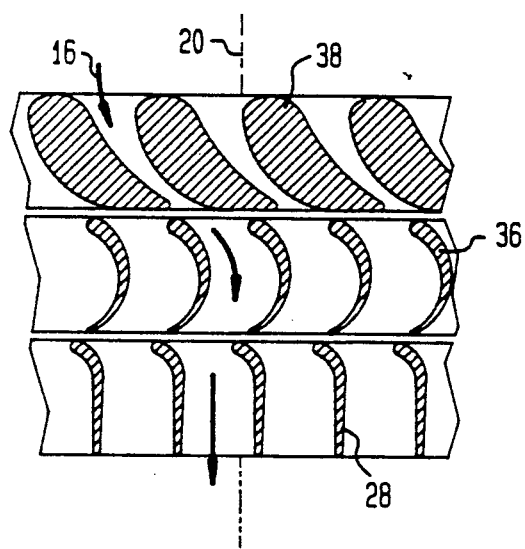
FIG. 5 is a schematic representation of the flow path of feedwater through the turbine blades of the turbopump illustrated in FIG. 3 taken along line 5—5.
Figure 6:
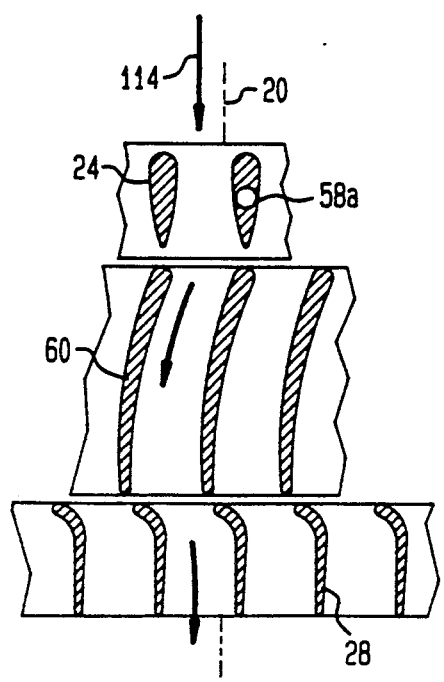
FIG. 6 is a schematic representation of the flow path of the coolant through the impeller of the turbopump illustrated in FIG. 3 taken along line 6—6.

Illustrated in FIG. 5 is a schematic representation of the flowpath for the feedwater 16 from the plenum 30 and through the nozzle vanes 38, the turbine blades 36, and the OGV's 28. Illustrated in FIG. 6 is a schematic representation of the flowpath of the coolant 114 from the downcomer 118 and through the turbopump 18 between the IGV's 24, the impeller blades 60, and the OGV's 28. The camber and twist of the various vanes and blades for these two flowpaths may be conventionally designed for obtaining suitable work from the feedwater 16 for rotating the impeller 26 at suitable velocities for pumping the coolant 114 in the downcomer 118.

Referring again to FIG. 2, the recirculation system 10 further includes a conventional steam turbine 66 conventionally joined in flow communication with the steam exit 116 of the reactor vessel 102 for receiving steam 68 for driving the steam turbine 66. The steam turbine 66 is conventionally joined to a conventional electrical generator 70 which is rotated by the turbine 66 for generating electrical power provided to a conventional power grid.

The feedwater supplying means 14 include a conventional feedwater pump 72 conventionally disposed in flow communication with the steam turbine 66 for receiving condensed steam therefrom for forming the feedwater 16 under pressure at about 1,000 psi (6.89 MPa). A conventional variable first control valve 74 is conventionally disposed in flow communication through a conduit 76 between the feedwater pump 72 and the turbopumps 18 for selectively regulating the feedwater 16 channeled from the pump 72 to the turbopumps 18 for controlling recirculation of the coolant 114 being pumped by the turbopumps 18. A conventional controller 78 is provided in conventional electrical communication with the first control valve 74 for selectively controlling the valve 74 for regulating the amount of the feedwater 16 passing therethrough.

A conventional variable second control valve 80 is disposed in conventional flow communication between the feedwater pump 72 and the feedwater sparger 122 for selectively regulating the feedwater 16 channeled from the pump 72 to the sparger 122. The second control valve 80 is disposed in parallel flow with the first control valve 74 so that the feedwater 16 from the pump 72 is split between the sparger 122 and the turbopumps 18. The controller 78 is also conventionally electrically connected to the second control valve 80 for controlling the amount of feedwater 16 channeled through the second valve 80 to the sparger 122. The controller is effective for controlling both the first and second control valves 74 and 80 inversely relative to each other so that each of the valves 74 and 80 further closes as the other valve further opens. Since the recirculation system 10 is substantially a closed loop system having a finite volume of water therein i.e. the feedwater 16 and the coolant 114, the returning feedwater 16 channeled from the pump 72 is preferably split between the sparger 122 and the turbopumps 18. Since the feedwater 16 returned to the vessel 102 through the turbopumps 18 is discharged from the turbopumps 18 and mixes with the coolant 114 in the downcomer 118, that amount of the feedwater 16 need not be channeled to the sparger 122 for reintroduction into the vessel 102.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A recirculation system for driving reactor coolant water in an annular downcomer defined between a boiling water nuclear reactor vessel and a core shroud spaced radially inwardly therefrom comprising:
   means for supplying feedwater to said vessel; and
   a turbopump disposed inside said downcomer and including:
     a stationary axle;
     a plurality of inlet guide vanes fixedly joined to an upstream end of said axle for receiving said coolant water from said downcomer;
     a pump impeller rotatably joined to said axle and having an inlet end for receiving said coolant water, and an outlet end for discharging said coolant water at an increased pressure;
     a plurality of outlet guide vanes fixedly joined to a downstream end of said axle for channeling said discharged coolant water back into said downcomer;
     an annular plenum surrounding said impeller and joined to said feedwater supplying means for receiving said feedwater;
     a plurality of circumferentially spaced turbine blades fixedly joined to said impeller and disposed in flow communication with said plenum for receiving said feedwater for rotating said impeller for driving said coolant water; and
     means for lubricating said impeller solely by said feedwater upon rotation of said impeller about said axle.

2. A recirculation system according to claim 1 wherein said impeller includes a plurality of circumferentially spaced mixed flow impeller blades, and said turbine blades are fixedly joined to said impeller blades at said impeller outlet end.

3. A recirculation system according to claim 2 wherein said turbopump further includes a plurality of circumferentially spaced stationary nozzle vanes joined in flow communication between said plenum and said turbine blades for channeling said feedwater to said turbine blades for rotating said impeller.

4. A recirculation system according to claim 3 wherein said turbine blades are disposed in flow communication with said outlet guide vanes for discharging said feedwater from said blades to mix with said discharged coolant water from said impeller.

5. A recirculation system according to claim 1 wherein said impeller further includes a radially inner cylindrical surface defining with said axle a radial bearing, and a radially extending aft surface defining with said axle an axial thrust bearing; and said impeller lubricating means is effective for channeling a portion of said feedwater from said plenum to both said radial and thrust bearings for supporting said impeller on said axle upon rotation of said impeller and for providing lubrication therebetween.

6. A recirculation system according to claim 5 wherein said impeller lubricating means includes a conduit extending in flow communication from said plenum to both said radial and thrust bearings for providing said feedwater thereto.

7. A recirculation system according to claim 1 wherein said turbopump has a longitudinal centerline axis disposed parallel to a longitudinal centerline axis of said vessel, and said inlet guide vanes and said outlet guide vanes are axially spaced from each other for driving said coolant water generally parallel to said vessel centerline axis within said downcomer.

8. A recirculation system according to claim 7 further including an annular pump deck extending radially outwardly from said vessel centerline axis and between said vessel and said core shroud for fixedly supporting said turbopump.

9. A recirculation system according to claim 8 wherein said vessel includes a reactor core disposed inside said core shroud, and said turbopump is disposed axially above said reactor core.

10. A recirculation system according to claim 1 further including a steam turbine joined in flow communication with said reactor vessel for receiving steam for driving said steam turbine; and said feedwater supplying means includes:
   a feedwater pump disposed in flow communication with said steam turbine for receiving condensed steam therefrom for forming said feedwater under pressure;
   a variable first control valve disposed in flow communication between said feedwater pump and said turbopump for selectively regulating said feedwater channeled from said feedwater pump to said turbopump for controlling recirculation of said coolant water being pumped by said turbopump; and
   a controller for controlling said first control valve.

11. A recirculation system according to claim 10 wherein said reactor vessel further includes a feedwater sparger; and said feedwater supplying means further includes:
   a variable second control valve disposed in flow communication between said feedwater pump and said sparger for selectively regulating said feedwater channeled from said feedwater pump to said feedwater sparger, said second control valve being disposed in parallel flow with said first control valve so that said feedwater from said feedwater pump is split between said feedwater sparger and said turbopump; and
   said controller is effective for controlling both said first and second control valves inversely relative to each other.

* * * * *